Feb. 28, 1950  M. JAY  2,499,249
ELECTRIC RAZOR

Filed Sept. 14, 1945  3 Sheets-Sheet 1

Inventor,
Marcel Jay
by Mauro & Leders
Attorney

Feb. 28, 1950   M. JAY   2,499,249
ELECTRIC RAZOR
Filed Sept. 14, 1945   3 Sheets-Sheet 2

Inventor
Marcel Jay
by Mauss & Louis
Attorneys

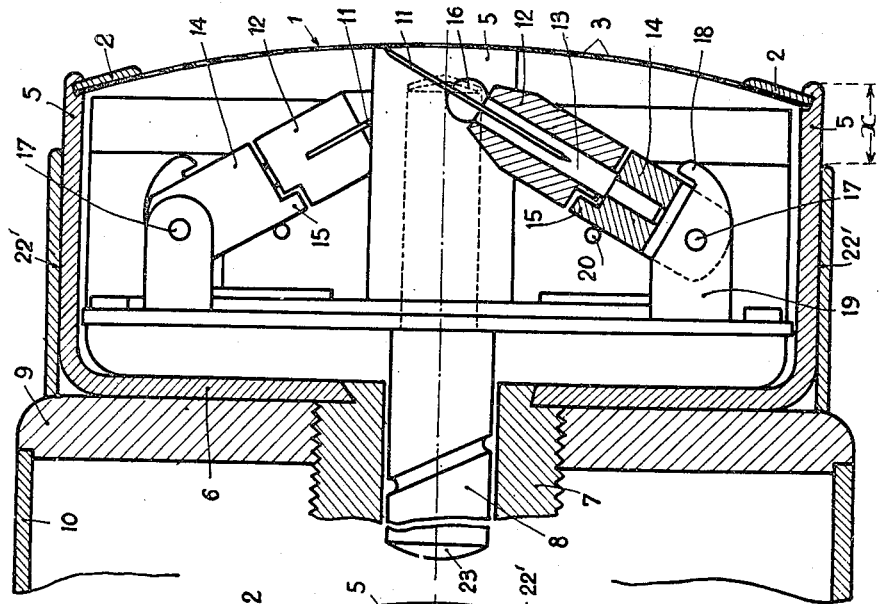
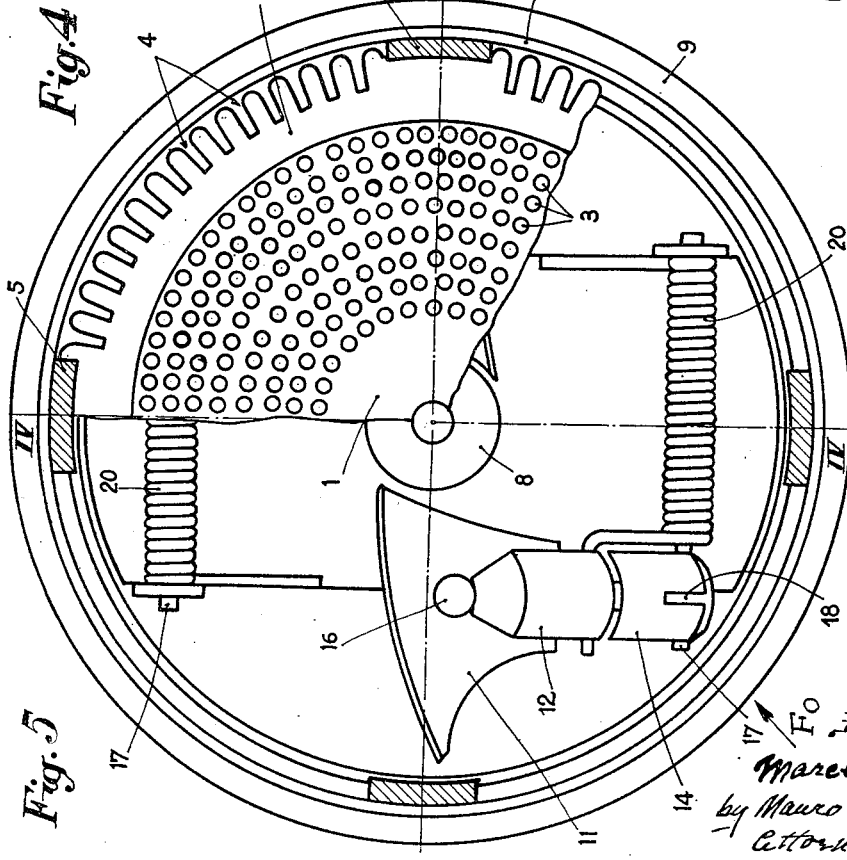

Patented Feb. 28, 1950

2,499,249

UNITED STATES PATENT OFFICE 2,499,249

ELECTRIC RAZOR

Marcel Jay, Paris, France

Application September 14, 1945, Serial No. 616,317
In France May 6, 1941

Section 1, Public Law 690, August 8, 1946
Patent expires May 6, 1961

4 Claims. (Cl. 30—43)

Electric razors have heretofore been produced which comprise a cutting head in which is mounted a cutter mechanism, the head being attached to a handle attached to an electric motor for operating said cutter mechanism.

In such razors the cutting head is characterized by a stationary cutter element comprising a thin cap-like grill or grate, semicircular in cross section, having a large number of small holes through which the hair is admitted to a movable cutter element operating underneath and in conjunction with the grill.

A principal object of the invention is the provision on the one hand of a perforated grill or grate on the periphery of which are carried fixed radial cutter teeth and on the other hand cutter blades adapted to sweep the perforated grill and the cutter teeth; with these elements is associated a sliding cover member or guard ring forming a shield or screen for said cutter teeth, which guard may be slid into open position when it is desired to employ the cutter teeth in the cutting of long hair, and which may be slid to closed position when it is desired to employ the invention only as a razor, as for the cutting of short hair.

The accompanying drawings illustrate the invention in two embodiments, whose further advantages will be understood from the description to follow. In said drawings:

Fig. 4 is a side view, partly cross sectional, of a second embodiment.

Fig. 5 is a plan view corresponding to Fig. 4, the grate being partly broken away.

Figure 1:
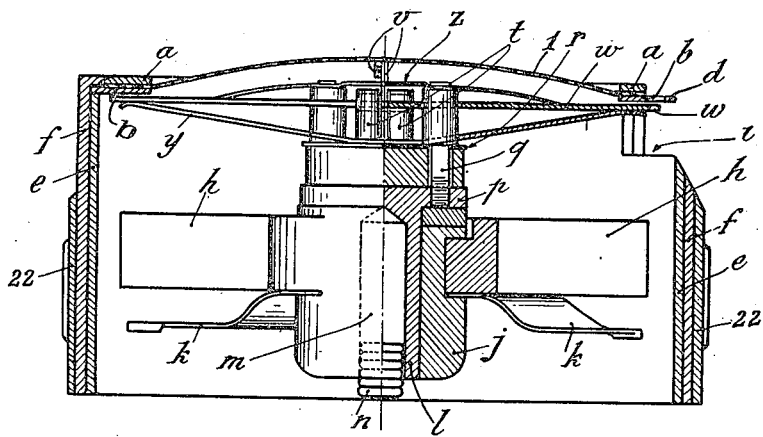
Fig. 1 is a view of one form of the invention, partly in section taken on the lines I—I of Fig. 3, the left side of the cutter mechanism being shown in elevation.
Figure 2:
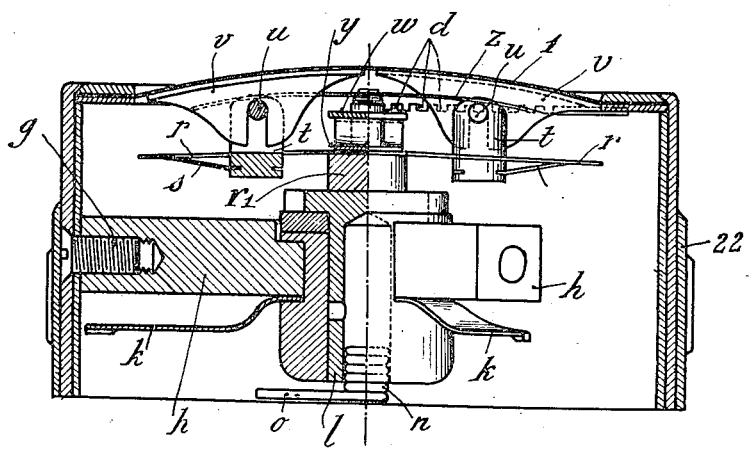
Fig. 2 is another view of said first form of the invention, partly in section taken on the lines II—II in Fig. 3, with the right hand part of the cutter mechanism being shown in elevation.
Figure 3:
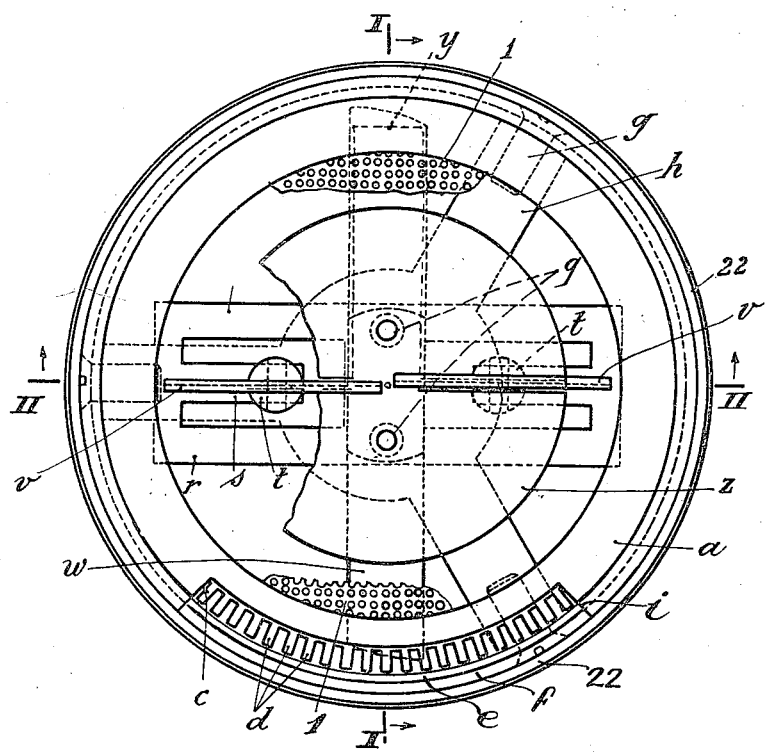
Fig. 3 is a plan view of the razor with the grate partly removed.
Figure 3A:
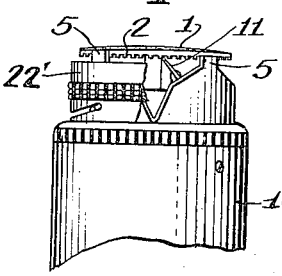
Fig. 3a is a view in perspective, with part of the motor casing and sliding guard cut away, showing the external appearance of the second embodiment.

The upper part or head of the razor illustrated in Figs. 1 to 3 includes a grate $l$ comprising a very large number of small holes. This grate which has the shape of a hemispherical cap having a more or less marked curvature and is as thin as possible while having a maximum rigidity and resistance to deformation.

Its periphery is inserted between two flat washers or circular ferrules $a$ and $b$. The outer ferrule $a$ carries through part of its periphery a notch $c$ (Fig. 3) and the lower ferrule $b$ is provided in front of the notch $c$ with teeth $d$ forming a comb. The grate is held fast between the two said ferrules $a$ and $b$ by concentric tubes $e$ and $f$ adapted to bear against one another and held rigidly together by means of screws $g$ (Fig. 2) engaging the arms of a central star-shaped support $h$. These two tubes $e$ and $f$ carry each a notch $i$ in front of the notch $c$ of the ferrule $a$ and of the teeth of the comb $d$ of the ferrule $b$. Along the outer tube $f$ may slide a screen or cover 22 which according to its position may hide or uncover the notches and the comb described above.

To the central star-shaped support $h$ is secured a bearing $j$ carrying a three-branch star of steel $k$, the ends of which are adapted to engage bayonet notches in the motor casing not shown in the drawing with a view to securing the head of the razor to the latter.

The bearing $j$ carries a shaft $l$ provided with a recess $m$ inside which is housed a frictional spring $n$ at the outer end of said recess and the end $o$ projecting laterally of said spring serves as a yielding driving member and torque limiting means.

The shaft $l$ carries a plate $p$ to which is secured by means of two screws $q$ a spring blade $r$. This blade is symmetrical on either side. It carries on its central arms $s$ diametrically opposed straps $t$ inside which may rest through their axes $u$ the cutting blades $v$ to be used for shaving.

The two screws $q$ carried by the plate $p$ of the shaft $l$ are arranged symmetrically with reference to the center of the head. They allow the guiding and the securing required for the hair cutting blade $w$, the thrust for which is ensured by the spring blade $y$ bearing on one hand against said blade $w$ and on the other against the shoulder $pl$ above the plate $p$. The driving of said blade $w$ and of the spring $y$ is provided for by the above mentioned screws $q$ rotating together with the shaft $l$.

These screws are covered by a protecting dome or cap $z$ which serve for preventing the hair and long hairs cut by the blade from entering inside the mechanism.

The operation of the arrangement is as follows: the system constituted by the operative head for shaving and cutting the hair is secured to a motor casing of a suitable type, by means of the star shaped spring $k$ rigid with the head through the agency of the support $h$ and of the screws $g$. The driving projection $o$ at the end of the spring $n$ is engaged by the driving projection of the motor so as to provide for the drive of the shaft $l$ and of the plate $p$ and thereby the rotation of the spring blade $r$ carrying the cutting blades $v$ which are applied against the grate $l$ through the pressure of spring $r$ which is located so as to be continuously tensioned.

The spring blade $r$ carrying the straps $t$ inside which are fitted the cutting blades $v$ exerts on one hand an axial flexibility directed along the axis of the motor so as to provide for the bearing of said cutting blades $v$ against the grate $l$, and on the other hand has an angular torsional flexibility allowing a certain suppleness in the cutting operation executed by the blades or knives. This angular flexibility allows the knives to recede in case of the introduction of a hard extraneous body inside the openings of the grate, which avoids any damage to the latter and also any damage to the knives and any consequent accidents.

The rotation of the plate $p$ produces through the screws $q$ the rotation of the hair cutting blade $w$ held by the spring $y$ against the lower surface of the ferrule $b$ whereby the hair engaging the teeth of the comb $d$ of the ferrule $b$ may be cut.

The movable screen or cover 22, the range of adjustment of which is limited between its covering and uncovering positions with reference to the notches $c$ and $i$ and to the comb $d$, is brought into its covering position only when a shaving operation is required.

In the embodiment illustrated in Figs. 3a, 4 and 5, 1 designates the grate constituted by a very thin sheet of beryllium bronze, which metal is used preferably to any other by reason of its easy machining and thermic treatment, of its very high resistance, of its inoxidisable character and of its low frictional coefficient over the tempered steel of cutting blades. This grate 1 assumes the shape of a hemispherical cap and it is reinforced around its periphery by a ring shaped member 2 preferably also of beryllium bronze, secured over it by welding or electrolytically.

This grate is perforated with a plurality of holes 3 having a small diameter arranged annularly and at the outer periphery of the ring shaped member 2 are provided slots 4.

This one-piece system including the grate 1 and the ring shaped member 2 is supported by a plurality of arms 5, four in the case illustrated, forming an open-work carrier or cage the bottom 6 of which is rigid with a threaded hub 7 forming a bearing for the driving shaft 8 and serving also for the securing of the carrier arms 5 to the bottom of the casing 10 containing the motor and forming the operative handle. The motor is secured to said bottom 9 and the system of the head and motor forms a single unit.

The cutting arrangement comprises substantially one or more blades such as 11, two in the case illustrated, said thin and plane blades being of tempered steel. Each of these blades is secured to the end of a sloping arm or strap 12 inside which the blade is fitted and adapted to be angularly set with reference to a shaft 13 secured to a pivotal strap 14. The blade 11 is moreover held inside the strap 12 by means of the head or rotula 16 carried by said shaft 13. The pivotal strap 14 is pivotally secured round a horizontal shaft 17, perpendicular to the axis 13, which forms a cardan mounting and the angular motion of the whole round this axis is limited by a stop 18 on the carrier plate 19 which rotates together with the driving shaft 8.

It should be noted that the blades 11 are each contained inside a plane cutting obliquely the hemispherical cap whereby the cutting edge assumes an arcuate shape.

When the motor starts, these blades are correctly positioned underneath the grate under the action of the springs 20.

The whole cutting mechanism including its carrier is covered by a removable ferrule 22' adapted to rest against the bottom 9 of the casing 10 the latter forming a handle. Ferrule 22 covers a large part of the cutting system without extending however up to the teeth 4 of the peripheral comb of the cap 12 which it leaves completely free with an important play $x$.

The handle or casing 10 is adapted to house any suitable type of electric motor such as is presently well known for the operation of electric razors. For this reason, no motor is illustrated in the drawings. The motor selected may be mounted on bottom plate 9 in handle 10 and suitably connected to shaft 8 carrying thrust bearing 23.

The motor need not be of the self-starting type, since the resistance torque of the invention is small, the cutting blades 11 being initially gently pressed against the grate by springs 20. Such a motor may be started by a simple wrist movement causing the motor to rotate on its axis.

The hard short hairs passing through the holes 3 of the grate 1 are consequently cut by the blades and the same is the case for the long hairs when the latter are combed through the slots 4.

The screen 22' prevents any fortuitous introduction of extraneous material into the rotary cutting device. It also prevents any accident from occurring at the lower end of the nose and underneath the ears, for instance when these parts of the face are approached either for shaving or for cutting the beard, whiskers or the like, ornamental growths.

What I claim is:

1. A device for selectively shaving short hairs or cutting long hairs, including, in combination, a support, fixed means for the entry of short hairs comprising a thin perforated grate, fixed means for the entry of long hairs comprising a plurality of radial teeth disposed on the periphery of said grate, power driven cutting means operable against said grate and said teeth, and a guard on said support selectively adjustable with respect to said radial teeth to shield said teeth from the entry of long hairs or expose said teeth to entry thereof.

2. A device for selectively shaving short hairs or cutting long hairs, including, in combination, a supporting holder, fixed means for the entry of short hairs comprising a thin circular perforated grate, fixed means for the entry of long hairs comprising a plurality of radial teeth disposed on the periphery of said grate, power driven cutting means operable against said grate and said teeth, and a guard ring slidably mounted on said holder and selectively adjustable with respect to said radial teeth to shield said teeth from the entry of long hairs or expose said teeth to entry thereof.

3. A device for selectively shaving short hairs or cutting long hairs, including, in combination, a supporting holder, fixed means for the entry of short hairs comprising a thin circular perforated grate, fixed means for the entry of long hairs comprising a plurality of radial teeth disposed around the circumference of said grate, power driven cutting means operable against said grate and said teeth, and a guard ring slidably mounted on said holder and selectively adjustable with respect to said radial teeth to shield said teeth from the entry of long hairs or expose said teeth to entry thereof.

4. A device for selectively shaving short hairs or cutting long hairs, including, in combination, a supporting holder, fixed means for the entry of short hairs comprising a thin circular perforated grate, fixed means for the entry of long hairs comprising a segment of radial teeth disposed on a portion of the periphery of said grate, power driven cutting means operable against said grate and said teeth, and a guard ring slidably mounted on said holder and selectively adjustable with respect to said segment of radial teeth to shield said teeth from the entry of long hairs or expose said teeth to the entry thereof.

MARCEL JAY.

REFERENCES CITED

The following references are of record in the file of this patent:

UNITED STATES PATENTS

| Number | Name | Date |
|---|---|---|
| 2,134,609 | Hay | Oct. 25, 1938 |
| 2,166,035 | Aronson | July 11, 1939 |
| 2,213,872 | Trachtenberg | Sept. 3, 1940 |
| 2,223,286 | Johnson | Nov. 26, 1940 |
| 2,247,661 | Moskovics et al. | July 1, 1941 |
| 2,282,539 | Bahr | May 12, 1942 |
| 2,300,397 | Abrams | Nov. 3, 1942 |
| 2,314,264 | Abrams | Mar. 16, 1943 |
| 2,322,337 | Bahr | June 22, 1943 |
| 2,365,368 | Verschvyl | Dec. 19, 1944 |